United States Patent [19]

Papp et al.

[11] 4,046,167

[45] Sept. 6, 1977

[54] MECHANICAL ACCUMULATOR

[75] Inventors: Joseph Papp, South Bend, Ind.; Richard A. Meisterheim, Dowagiac; S. Eugene Hubbard, Niles, both of Mich.

[73] Assignee: Kawneer Company, Inc., Niles, Mich.

[21] Appl. No.: 655,724

[22] Filed: Feb. 6, 1976

[51] Int. Cl.$^2$ .................... F16L 55/04; F01B 15/02; F01B 31/00

[52] U.S. Cl. .................................. 138/31; 92/117 A; 92/130 C; 92/130 D

[58] Field of Search ............... 138/31; 92/107, 130 C, 92/130 D, 117 R, 117 A

[56] References Cited

U.S. PATENT DOCUMENTS

| | | | |
|---|---|---|---|
| 2,321,093 | 6/1943 | Lupper | 138/31 |
| 2,752,754 | 7/1956 | Jaseph | 138/31 |
| 2,993,472 | 7/1961 | Einsiedler | 92/117 R |
| 3,038,493 | 6/1962 | Griffith | 92/107 |

*Primary Examiner*—Steven L. Stephan
*Attorney, Agent, or Firm*—Mason, Kolehmainen, Rathburn & Wyss

[57] ABSTRACT

A mechanical accumulator for holding and supplying a volume of hydraulic fluid under pressure comprising a variable volume fluid pressure chamber including a piston and a cylinder member, a plurality of coil springs acting on one of said members for biasing the same towards the other of said members to minimize the volume of said chamber and pressurize the fluid therein, a fluid conduit for directing pressurized fluid into and out of said chamber and switch means externally of said chamber and actuated by one of said members in response to the volume changes of said chamber for controlling the operation of a fluid device using fluid from the chamber.

3 Claims, 10 Drawing Figures

MECHANICAL ACCUMULATOR

BACKGROUND OF THE INVENTION

1. Field of the Invention

The present invention relates to hydraulic accumulators and more particularly, relates to a compact hydraulic accumulator suitable for use with a power pack of an automatic door actuator of the type as shown in U.S. Pat. No. 3,620,014 which patent is assigned to the same Assignee as the present application.

With the increasing usage of electrically controlled automatic doors for entrances of commercial establishments and the like, it has been a problem to provide a door actuator which is powerful enough to open a relatively heavy door in rapid fashion and then close the door after the traffic has passed through the entrance. This problem is most readily solved by use of an accumulator to store hydraulic fluid under pressure for release as required and particularly there is a need for an accumulator which is reliable and operates with a minimum of service and maintenance difficulties. Because of the relatively high power requirements in these types of applications, it has been necessary to utilize hydraulic systems which employ relatively high pressure and thereby reduce the size of the door operator unit so that it can be hidden from view by mounting in a transom bar or the like above the door entrance. This arrangement results in greater architectural flexibility in the design of entrances and does not require a large, unsightly mechanism as often are common with other types of door operators. In addition, in establishments such as super markets and the like, it is neccessary to provide a rapid door opening cycle to accommodate the large volume of traffic flow and this in turn requires a relatively high power system which is capable of developing high energy during short periods of time to handle the large heavy duty type entrance doors.

2. Description of the Prior Art

In the aforementioned U.S. Pat. No. 3,620,014, therein is illustrated an automatic door actuator employing a power pack which is electrically actuated by an electric control module in turn actuated by the presence of traffic on a switch mat or the like. The control module may also be activated by other traffic presence detectors and when activated to open a door, the control module activates a control valve in the power pack in order to supply high pressure hydraulic fluid to a hydraulic door actuator which rapidly swings the door to an open position. As the actuator opens the door, a return spring is compressed and once the traffic is clear of the entrance, the control spring then returns the door back to a closed position. The hydraulic actuator of such a unit requires a relatively high rate of flow of high pressure fluid to cause the door to swing open rapidly, that is with enough speed to accommodate the high volume traffic rates required. Accordingly, the motor powered hydraulic pump of the power pack must be supplemented with additional hydraulic fluid under pressure available from an accumulator or pressurized reservoir.

Accumulators and reservoirs of this type are commonly pressurized by means of a charge of nitrogen gas acting on one side of a flexible diaphragm or piston to pressurize the hydraulic fluid in a chamber on the adjacent opposite side. Because in theory, the pressure of the nitrogen gas and hydraulic fluid is equal, there are normally few leakage problems during operation of these types of accumulators. However, when an accumulator is shut down, for instance at night time, the nitrogen gas tends to leak past the seals on the pistons and the like and in addition, because the nitrogen charge is usually lost if servicing of the unit is required, servicing is difficult and costly and unskilled maintenance or servicemen cannot be used. In addition, because accumulators of the nitrogen gas type are often located in positions where the temperatures may vary in a wide range, the sealing and gas leakage problems often are acute and greatly amplified and many times when sealing failures occur, it is necessary to return the whole pack unit to the factory for a complete overhaul or rebuilding job by skilled personnel to insure continued operation. In the particular entrance door application as shown in the aforementioned U.S. Patent, an electric switch for controlling the pump motor of the system is positioned in the nitrogen filled chamber, and replacement of the switch is often difficult, In addition, sealing around the electrical leads, where the leads pass out of the gas chamber is another area where leakage of nitrogen may occur.

OBJECTS OF THE INVENTION

It is an object of the present invention to provide a new and improved hydraulic accumulator of the character described and more particularly, a hydraulic accumulator or a design especially adapted for use in a power pack like that shown in the aforementioned U.S. patent.

Another object of the present invention is to provide a new and improved hydraulic accumulator employing a plurality of coil springs in a cylindrical array and eliminating the need for pressurized nitrogen gas.

Another object of the present invention is to provide a new and improved hydraulic accumulator which requires fewer precision parts, a simpler assembly procedure, has an indefinite shelf life, better operating pressure stability and which is more easily repairable in the field by relatively unskilled personnel, yet relatively small in size, relatively low in cost in comparison to a nitrogen gas accumulator, and operationally reliable.

Another object of the present invention is to provide a new and improved hydraulic accumulator of the character described which provides long trouble-free operation in comparison with a nitrogen gas type and which has a much lower maintenance and repair cost, and fewer requirements for servicing.

Moreover, another object of the present invention is to provide a new and improved hydraulic accumulator which does not require as high a skill level for maintenance and periodic adjustment as does a nitrogen gas type accumulator.

Still another object of the present invention is to provide a new and improved hydraulic accumulator which can be installed in a door actuator of the type shown in the aforementioned U.S. Patent in place of a nitrogen gas filled accumulator with few, if any, changes being required.

SUMMARY OF THE INVENTION

The foregoing and other objects and advantages of the present invention are accomplished in an illustrated embodiment, by way of example and not limitation, comprising a hydraulic accumulator for holding and supplying a volume of hydraulic fluid under pressure. The accumulator includes a variable volume, fluid pressure chamber having a piston member and a cylinder member. A plurality of coil springs are mounted in a cylindrical array acting on one of said members for biasing the same toward the other member to continuously tend to minimize the volume of the pressure chamber and maintain the needed fluid pressure. A fluid conduit is provided for directing fluid into and out of the chamber and switch means externally of the fluid chamber is mounted for actuation by one of the piston or cylinder members in response to a selected value of volume change so that fluid under pressure is automatically supplemented by fluid from an external pump to provide the volume flow rate neeeded for operation of a fluid device such as a door actuator.

BRIEF DESCRIPTION OF THE DRAWINGS

For better understanding of the present invention, reference should be had to the following detailed description taken in conjunction with the drawings in which.

DESCRIPTION OF THE PREFERRED EMBODIMENT

Figure 1:
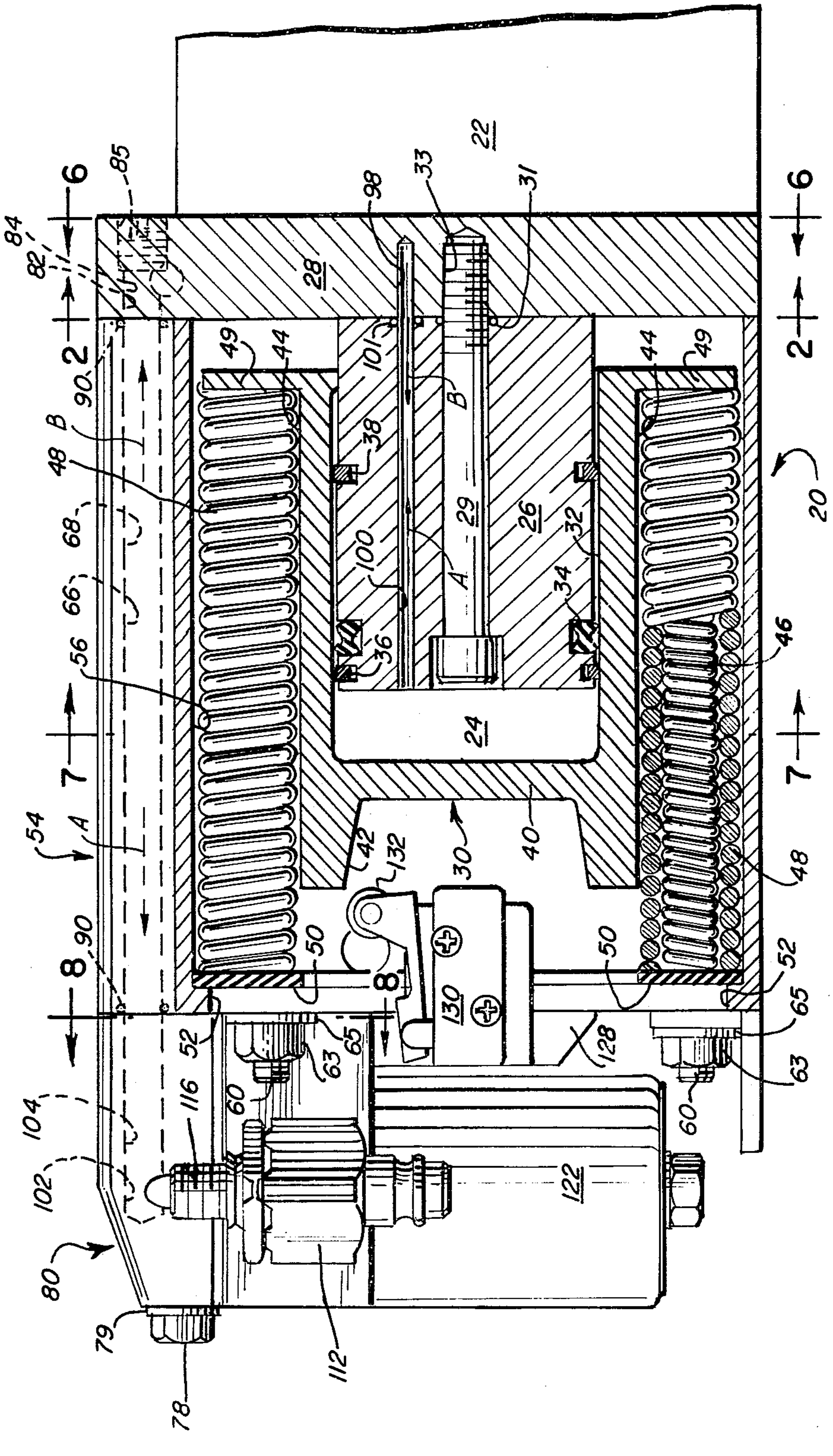
FIG. 1 is a longitudinal cross-sectional view of a new and improved hydraulic accumulator constructed in accordance with the features of the present invention.

Referring now more particularly to the drawings, therein is illustrated a new and improved hydraulic accumulator constructed in accordance with the features of the present invention and referred to generally by the reference numeral 20. The accumulator 20 is specifically designed as a replacement for a nitrogen gas filled accumulator of the type utilized in a power pack for an automatic door actuator as shown and described in U.S. Pat. No. 3,620,014, which patent is incorporated herein by reference.

The accumulator 20 of the present invention is of relatively small size and is compact so that it may be placed in a transom bar above an entrance door and the accumulator is especially adapted for connection with an integral pump and motor housing 22 of the type similar or identical to that described in the aforementioned U.S. Patent. The accumulator includes a variable volume fluid pressure chamber 24 adapted to contain a supply of hydraulic fluid or the like under suitable operating pressure for use in activating a fluid device such as the door actuator as shown in the aforementioned U.S. patent. The variable volume fluid chamber 24 is formed by a fixed cylindrical piston member 26 which is secured onto a pump block plate 28 by means of a single bolt type fastener 29 having a socket type head seated within an enlarged axial recess provided in an axial bore of the piston member. The fastener 29 is threaded into an aperature 33 formed in the pump block plate and an 0-ring 31 is provided to seal around the fastener between the base of the piston and the abutting surface of the pump block plate.

The fluid chamber changes volume with relative movement between the piston 26 and a cylinder body 30 which is slidably mounted thereon and formed with an axial bore 32 open at an end facing the pump block plate. The bore of the cylinder is slightly larger in diameter than the piston and a sealing ring 34 having an hourglass shaped cross-section is carried in a groove on the piston to seal between the piston and the bore of the cylinder. A pair of piston rings 36 and 38 are mounted in grooves on the piston on opposite sides of the sealing ring 34 to support the cylinder for smooth sliding movement.

Figure 7:
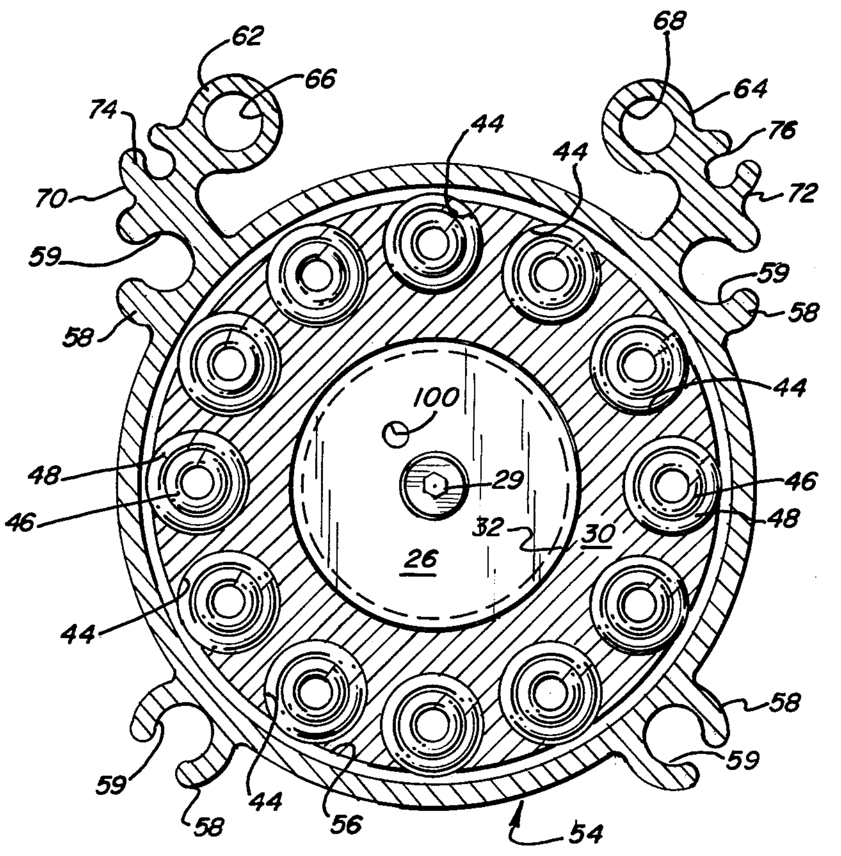
FIG. 7 is a transverse, cross-sectional view taken substantially along lines 7—7 of FIG. 1.

The cylinder body 30 is formed with a cylinder head 40 intermediate its ends and a cup indentation or recess 42 is provided adjacent the outer, free end of the cylinder body as shown in FIG. 1. The cylinder includes an outer surface which is generally cylindrical in shape and a plurality of longitudinally extending recesses 44, each of circular cross-section are formed in the cylinder body in a generally cylindrical array in order to accommodate a plurality of pairs of coaxially aligned coil springs 46 and 48 as best shown in FIGS. 1 and 7. The cylindrical spring recesses 44 are spaced equilaterally around the cylinder body and terminate short or the end of the cylinder that faces the pump block plate in a flange 49. This flange transmits the thrust of the coil springs to the body of the sliding cylinder. The opposite ends of each pair of coil springs 46 and 48 bear against a heavy thrust washer 50 which in turn is seated against an inwardly directed annular end flange 52 formed in a hollow extruded casing member or shell 54 having a cylindrical bore 56 dimensioned slightly larger than the cylinder body 30. The thrust washer 50 is formed of strong alloy steel or the like with suitable thickness to withstand the heavy bearing pressures exerted by the pairs of coil springs 46 and 48. The interior bore 56 of the casing 54 is formed by drilling or machining and terminates short of the outer free end of the cylinder body to form the retaining end flange 52 as shown. A precision fit between the bore 56 of the casing 54 and the cylinder body 30 is not required and the only surfaces that require precise machining are the outer cylindrical surfaces of the piston 26 and the inner bore surface 32 on the cylinder body. Because the cylinder is supported for sliding reciprocal movement on the piston by the piston rings 36 and 38 honing or laping of the piston is not needed and the rings provide sufficient alignment of the cylinder and piston to guide the cylinder as it moves back and forth in the outer casing 54.

Figure 5:
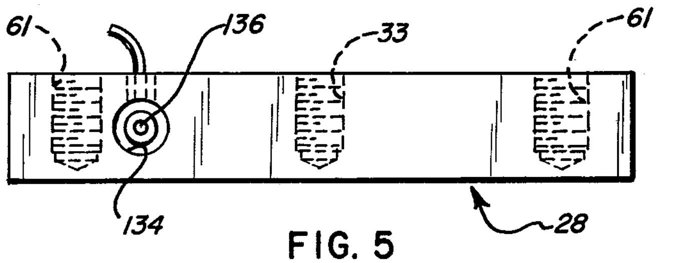
FIG. 5 is a fragmentary, elevational view looking in the direction of the arrows 5—5 of FIG. 2.
Figure 6:
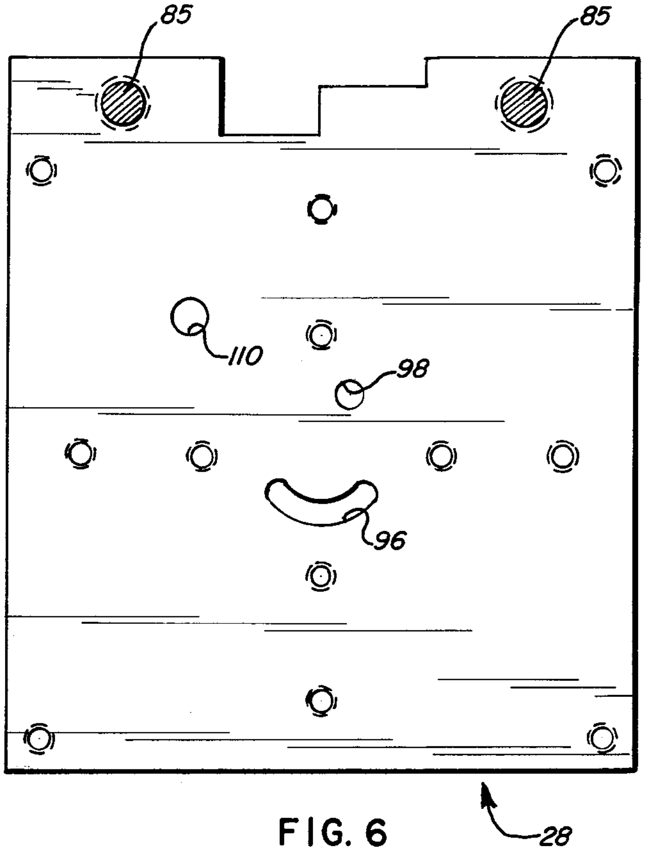
FIG. 6 is a transverse, cross-sectional view taken substantially along lines 6—6 of FIG. 1.

As best shown in FIG. 7, the casing or shell 54 is preferably formed of an aluminum extrusion and includes a plurality of pairs of equilaterally spaced apart longitudinally extending, external ribs 58, pairs of which define cylindrical bores 59 adapted to receive elongated tie rods 60 having threaded end portions *60a* (FIG. 2) engaged within threaded aperatures 61 formed in the pump block plate 28 (FIG. 5). As viewed in FIG. 7, the casing extrusion 54 is also formed with a pair of irregularly cross-sectional external ribs 62 and 64, respectively, having fluid passages 66 and 68 formed therein for supplying and returning hydraulic fluid to and from the actuator of the door operator. The casing or shell extrusion includes rib sections 70 and 72 defining bores 74 and 76 in order to accommodate cap screws 78 (FIG. 1) threaded into these bores for attaching a solenoid block member 80 against an outer end of the casing 54 as shown in FIG. 1.

As best shown in FIG. 7, the interior bore 56 of the extruded casing is larger than the cylinder 30 which slides freely within the bore dependant upon the demands for hydraulic fluid and the biasing force of the coil springs 46 and 48 carried thereby. The casing is secured to the pump block plate 28 with the elongated tie rods 60 and nuts 63 and washers 65 on the outer ends of the tie rods and the inner threaded end portions 60*a* of the tie rods extend into the threaded aperatures 61 in the pump block as described. Similarly, the solenoid block 80 is secured against the outer end of the casing by the pair of cap screws 78 having threaded shank portions threadedly engaging the bores 74 and 76 of the rib portions 70 and 72 and the washers 79 are provided to better distribute the forces from the heads of the cap screws against the aluminum pump block.

Figure 2:
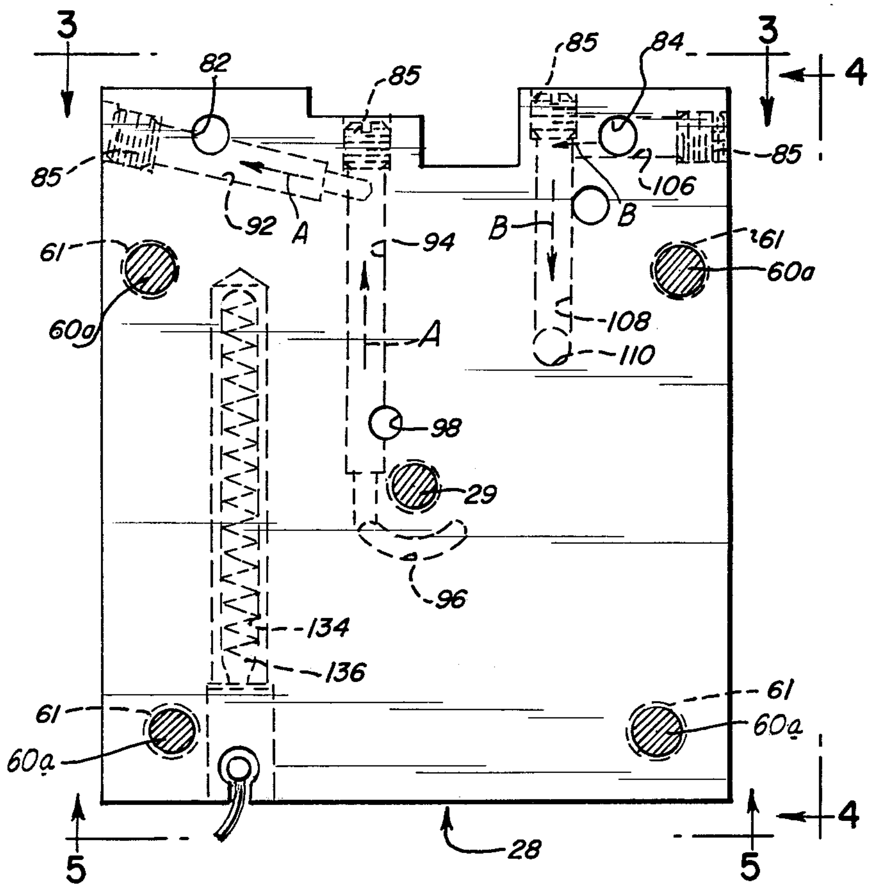
FIG. 2 is a transverse cross-sectional view taken substantially along lines 2—2 of FIG. 1.
Figure 4:
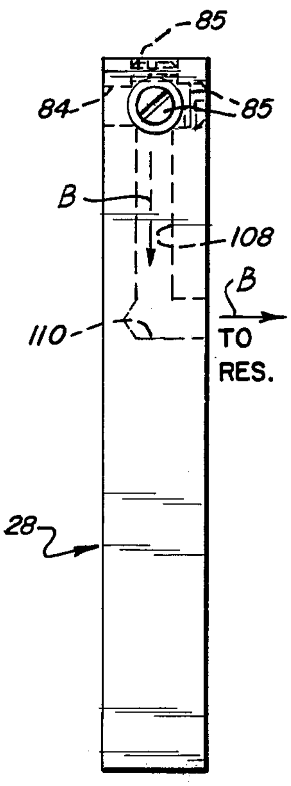
FIG. 4 is a fragmentary, elevational view looking in the direction of the arrows 4—4 of FIG. 2.
Figure 3:
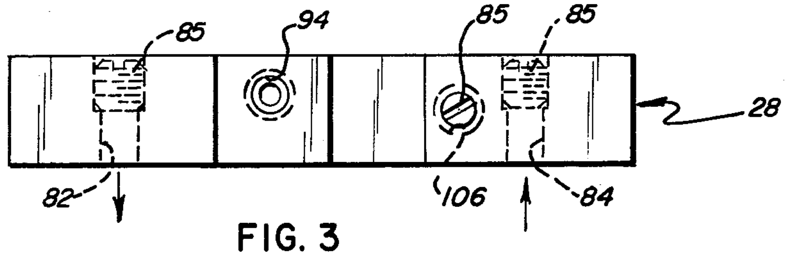
FIG. 3 is a fragmentary, elevational view looking in the direction of the arrows 3—3 of FIG. 2.

As shown in FIG. 1, 0-rings 90 are provided at opposite ends of the hydraulic supply passage 66 and the return passage 68 in the casing 54 and coaxial supply and 28 are in direct communication therewith. The 0-rings 90 are mounted in shallow annular recesses formed at opposite ends of the passages in the casing 54 and bear against the faces of the pump block 28 and the solenoid block 80. The pump block is preferrably formed of aluminum plate with a flat face fitting tightly against the end of the casing. The opposite parallel face of the pump block bears against the pump housing 22. As shown in FIGS. 1 and 3, the outer end portion of the passages 82 and 84 is threaded in order to receive a closure plug 85 and the supply passage 82 is in communication with a laterally inwardly extending transverse passage 92 having a threaded portion adjacent the outer end for receiving a closure plug 85 (FIG. 2). The inner end of the passage 92 is in communication with the upper portion of a vertical passage 94 also having a threaded outer end portion for receiving a closure plug 85. The lower end of the vertical passage 94 is in communication with an arcuate slot 96 which is supplied with pressurized hydraulic fluid from a pump mounted in the attached pump and motor housing 22. The passage 94 is in communication with a short, blind end passage 98 which is in coaxial alignment with a passage 100 formed in the piston 26 in communication with the variable volume fluid pressure chamber 24. An 0-ring 101 is mounted in a recess in the piston to seal between the abutting faces of the pump block and the piston around the passages 98 and 100. Because the passage 94 is in direct communication with the variable volume fluid chamber 24 via the passages 98 and 100, and also in communication with the pump through the arcuate passage 96, pressurized fluid may be supplied to the passage 66 for use by an actuator of a door operator from either or both sources of pressurized fluid, namely the chamber 24 of the hydraulic pump in the housing. On demand, pressurized fluid flows in the direction of the arrows "A" (FIGS. 1 and 2) via the passages 100, 98, 96, 94, 92, 82 and 66 into a passage 102 in the solenoid block 80. The solenoid block 80 is also provided with a return passage 104 and the passages 102 and 104 are arranged in coaxial alignment with the passages 66 and 68 respectively, in the housing or casing 54.

The return passage 104 in the solenoid block directs fluid back from a door actuator or the like via the passage 68 in the casing 64 into the passage 84 of the pump block 28. The passage 84 is closed adjacent its outer end by a closure plug 85 (FIG. 2) and at the inner end is in communication with the short passage 106 which in turn is in communication with a vertical passage 108. At the lower end, the passage 108 is in communication with a blind end, return passage 110 which directs the returning fluid back into the reservoir of the pump and motor housing 22. The passages 84, 106 and 108 are closed adjacent their outer ends by closure plugs 85.

Figure 8:
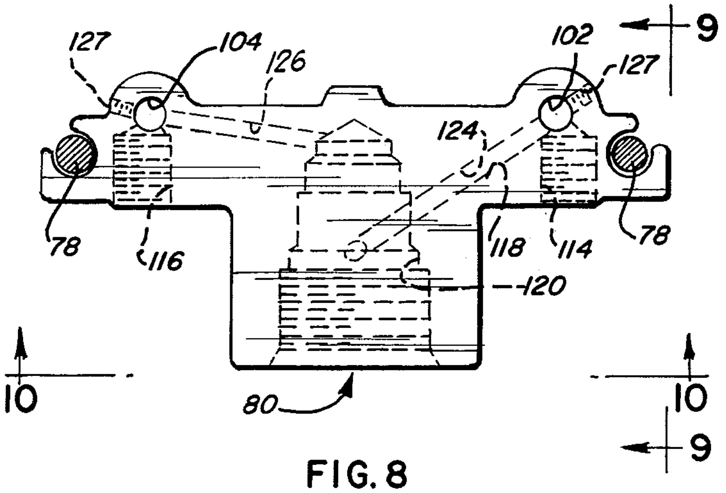
FIG. 8 is a transverse, cross-sectional view taken substantially along lines 8—8 of FIG. 1.
Figure 9:
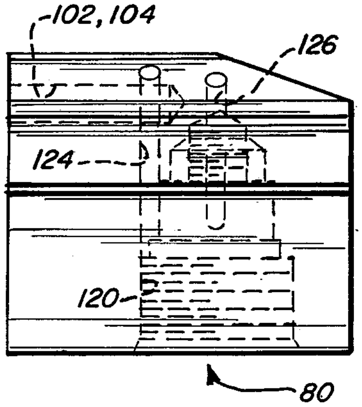
FIG. 9 is an elevational view looking in the direction of the arrows 9—9 of FIG. 8.
Figure 10:
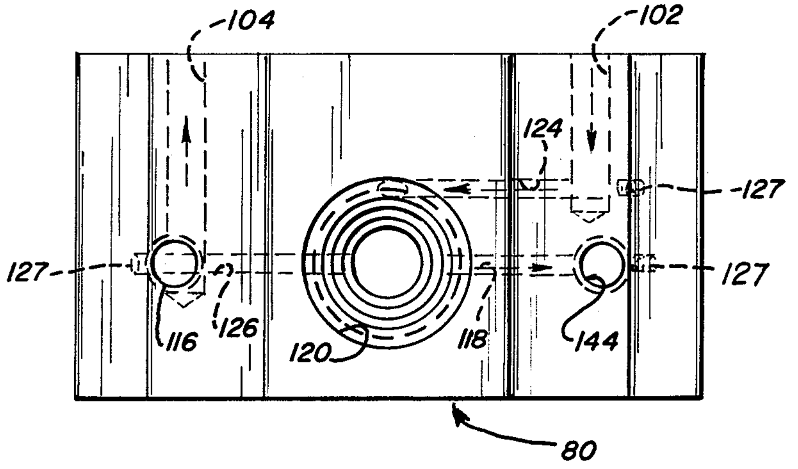
FIG. 10 is a fragmentary, elevational view looking in the direction of the arrows 10—10 of FIG. 8.

The pressurized fluid and the returning fluid moving to and from the solenoid block 80 is directed via flexible hydraulic hoses (not shown) which are connected to the door actuator and these hoses in turn, are connected to the accumulator system by means of quick disconnect fittings 112 (FIG. 1) which have threaded upper end portions engaged within threaded passages 114 and 116 in the pump block 80 as shown in FIGS. 8 and 10. The return passage 116 is in direct communication with the passage 104 (FIGS. 8 and 10). The supply passage 114 is in communication with passage 118 extending from an enlarged, central, valve bore section 120.

The lower portion of the bore section 120 is threaded in order to receive a threaded upper end portion of an electrically controlled solenoid valve 122. When activated, the solenoid valve 122 directs a flow of pressurized fluid from the chamber 24 of the accumulator 20 or the pump in the housing 22 into the door actuator and when the actuation is completed, the solenoid valve then shuts off the flow of fluid. Pressurized fluid is supplied to the solenoid valve bore 120 via a passage 124 in communication with the central valve bore 120 approximately at mid-level as shown in FIG. 8. When the solenoid valve 122 is opened, this pressurized fluid is then directed outwardly via a passage 118 into the upper end of the supply passage 114 (FIGS. 8 and 10). Any leakage of high pressure fluid from the upper end of the valve bore 120, is directed back to the return system through a passage 126 in communication with the upper end of the passage 116 and the passage 104. Suitable closure plugs 127 are provided at the outer end portions of the passages 118, 124 and 126 (FIG. 10).

The moving cylinder 30 is adapted to control the operation of the pump in the pump and motor housing 22 and for this purpose, the accumulator 20 includes a bracket 128 at the outer end of the casing 64 for supporting a microswitch 130 (as shown in FIG. 1). The microswitch 130 includes a pivoting operator having a roller 132 adjacent the outer end adapted to engage the frustroconical tapered surface of the recess 42 on the outer end of the cylinder member 30.

On operation of the valve 122 whenever the switch mat or other traffic presence detector electronic system senses the presence of a person wishing to pass through the entrance, pressurized fluid from the accumulator is directed to the door actuator via the supply passages as described. When this occurs, fluid is taken from the chamber 24 and the springs 46 and 48 bias the cylinder to reduce the volume of the fluid chamber 24 and maintain operating pressure on the hydraulic fluid. When the piston member 30 moves far enough towards the right (as shown in FIG. 1), the cam surface of the recess 42 on the outer end of the piston no longer depresses the operator roller 132 on the arm of the microswitch and the switch is thereby activated to start the hydraulic pump in the housing 22. As the pump begins to supply pressurized fluid to the accumulator and the door actuator via the passages 96 and 98, the demand for fluid from the accumulator chamber 24 decreases, and the flow of pressurized fluid to the door actuator of the door operator unit is maintained at a relatively constant pressure. After the demand for fluid is satisfied in the door actuator, continued operation of the pump begins to expand the variable volume accumulator chamber 24 against the force of the biasing springs 46 and 48. As fluid flows into the chamber through the passages 98 and 100, the piston 30 is moved outwardly (to the left as shown in FIG. 1) and this movement continues until the frustroconical cam surface of the recess 42 on the outer end of the cylinder 30 engages and depresses the roller 132 on the microswitch 130 to shut off the hydraulic pump. In this condition, the pressurized fluid in the chamber 24 exerts just enough force against the cylinder 30 to balance the force of the pairs of accumulator springs 46 and 48 and the chamber remains with a supply of pressurized fluid ready for the next cycle of operation when demand for fluid occurs.

From the foregoing it will be seen that the mechanical accumulator system 20 in accordance with the present invention does not require the use of nitrogen gas and accordingly, eliminates the troublesome problems often associated therewith. The pump controlling microswitch 130 does not have to be mounted within a nitrogen filled chamber and there is no problem associated with passage of electrical leads and the like through a gas pressurized chamber wall.

The bias springs 46 and 48 are chosen of a size needed to provide the desired working pressure for the system. The cylinder 30 is supported for reciprocal sliding movement on the fixed piston 26 by the piston rings 36 and 38 and extremely close dimensional tolerances are not required as fluid sealing is accomplished by the sealing ring 34 which provides extremely good sealing during operational as well as dormant periods. Because no gas is required in the accumulator, sealing is considerably less difficult. The machining of the cylinder 30 and the casing 54 need not require great precision and the tolerances for the spring receiving bores 44 on the cylinder and the internal bore 56 of the casing 54 are such that drilling alone is precise enough.

The accumulator thus is considerably less expensive and troublesome than its nitrogen gas filled counterpart and is free of many of the defects heretofore mentioned and problems associated with a containment, sealing and storage of nitrogen gas.

Because the accumulator 20 may be located in severe weather environments where low temperatures and moisture are present, the pump block plate 28 is provided with a blind end bore or passage 134 in order to receive a thermostatically controlled electric heater assembly 136 for insuring that hydraulic fluid in the passage of the accumulator pump block plate 28 and associated components do not become congealed in extremely cold weather.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A mechanical accumulator for holding and supplying a volume of fluid under pressure comprising:

a cylindrical hollow casing closed at one end with a fixed end wall and having an inwardly extending annular end wall adjacent an opposite end forming an open end of said casing;

a variable volume fluid pressure chamber formed by a cylindrical piston in coaxial alignment in said casing fixedly secured to said fixed end wall and an annular outer cylinder slidably mounted on said piston for reciprocal movement toward and away from said fixed end wall and closed adjacent an end opposite said fixed end wall, said cylinder including a plurality of longitudinally extending recesses of substantially circular transverse cross-section positioned adjacent an outer wall surface in parallel, equilaterally spaced relation with respect to a central longitudinal axis of said piston, each of said recesses having a transverse end wall adjacent said fixed end wall of said casing;

a pair of coaxial coil springs mounted in each of said recesses acting in compression between said annular end wall of said casing and the end wall of the recess for biasing said cylinder toward said fixed end wall of said casing to minimize the volume of said pressure chamber;

a fluid conduit in said piston for directing pressurized fluid into and out of said chamber; and switch means externally of said fluid chamber actuated by movement of said cylinder in response to volume changes of said chamber for controlling the operation of a fluid device in fluid communication with said chamber.

2. The accumulator of claim 1 wherein said cylinder includes a cam surface engageable with said switch means to actuate the same when the volume of said chamber reaches a predetermined level.

3. The accumulator of claim 1 wherein said cylinder comprises a tubular extrusion with said spring receiving recesses formed to open on said outside wall surface.

* * * * *